(12) United States Patent
Paul et al.

(10) Patent No.: US 6,763,417 B2
(45) Date of Patent: Jul. 13, 2004

(54) FIBRE CHANNEL PORT ADAPTER

(75) Inventors: Harry V. Paul, Haddonfield, NJ (US);
Anthony G. Tornetta, King of Prussia, PA (US); James C. Wright, Sewell, NJ (US)

(73) Assignee: Computer Network Technology Corporation, Minneapolis, MN (US)

( * ) Notice: Subject to any disclaimer, the term of this patent is extended or adjusted under 35 U.S.C. 154(b) by 99 days.

(21) Appl. No.: 10/022,195

(22) Filed: Dec. 20, 2001

(65) Prior Publication Data

US 2002/0116564 A1 Aug. 22, 2002

Related U.S. Application Data

(60) Provisional application No. 60/257,023, filed on Dec. 20, 2000.

(51) Int. Cl.$^7$ .............................................. G06F 13/00
(52) U.S. Cl. ..................................... 710/316; 710/315
(58) Field of Search ............................... 710/305–306, 710/309–311, 313–317, 62–64, 72, 74, 104, 33, 34, 61; 711/111–114, 147–150; 709/227–230; 370/403–405, 409, 222

(56) References Cited

U.S. PATENT DOCUMENTS

| | | | |
|---|---|---|---|
| 5,345,228 A | 9/1994 | Franaszek et al. | 340/825.79 |
| 5,430,442 A | 7/1995 | Kaiser et al. | 340/825.79 |
| 5,732,011 A | 3/1998 | Schmidt | 365/73 |
| 5,784,386 A | 7/1998 | Norris | 371/36 |
| 5,796,733 A | 8/1998 | Norris | 370/366 |
| 5,805,614 A | 9/1998 | Norris | 371/37.02 |
| 5,809,328 A * | 9/1998 | Nogales et al. | 710/5 |
| 5,812,556 A * | 9/1998 | Schmidt | 371/3 |
| 5,838,179 A | 11/1998 | Schmidt | 327/156 |
| 5,894,481 A | 4/1999 | Book | 370/412 |
| 5,894,560 A | 4/1999 | Carmichael et al. | 395/845 |
| 5,920,695 A * | 7/1999 | Hathorn et al. | 709/200 |
| 6,148,004 A | 11/2000 | Nelson et al. | 370/463 |
| 6,477,171 B1 * | 11/2002 | Wakeley et al. | 370/404 |
| 6,502,162 B2 * | 12/2002 | Blumenau et al. | 711/5 |

FOREIGN PATENT DOCUMENTS

WO WO 99/41862 * 8/1999 ............. H04J/3/16

OTHER PUBLICATIONS

Tornetta et al., Pub No. US2002/0034197, High speed linking module.*

* cited by examiner

Primary Examiner—Paul R. Myers
Assistant Examiner—Raymond N Phan
(74) Attorney, Agent, or Firm—Beck & Tysver, PLLC

(57) ABSTRACT

A method of adapting a native ESCON director to provide fibre channel switching capability includes providing a fibre channel port adapter comprising one or more boards that can be installed into slots in a multi-protocol channel switch having a central switch; connecting said port adapter to a Fibre Channel device; wherein said method permits interconnection through said central switch, thereby allowing connection between and exchange of information between any two desired ports

16 Claims, 10 Drawing Sheets

Director with FCPA and ESCON

FCPA Block Diagram

InterProcessor Communications Block Diagram

Interface Timing for Frames from Link

Interface Timing for Frames to Link

Inserted EOF Character

FIBRE CHANNEL PORT ADAPTER

PRIORITY

This application claims priority to the provisional U.S. patent application entitled, Fibre Channel Port Adapter, filed Dec. 20, 2000, having a Ser. No. 60/257,023, the disclosure of which is hereby incorporated by reference.

FIELD OF THE INVENTION

The present invention relates generally to fibre channel transmissions. More particularly, the present invention relates to a fibre channel port adapter that connects to an open system and allows the multi-protocol channel switch to act as a part of the fabric topology.

BACKGROUND OF THE INVENTION

Mainframes, super computers, mass storage systems, workstations and very high-resolution display subsystems are frequently connected together to facilitate file and resource sharing. Common networks and channels used for these types of connections oftentimes introduce a communications bottleneck, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions.

One type of communications interconnect that has been developed is fibre channel. The fibre channel protocol was developed and adopted as the American National Standard for Information Systems (ANSI). See Fibre Channel Physical and Signaling Interface, Revision 4.3, American National Standard for Information Systems (ANSI) (1994) for a detailed discussion of the fibre channel standard. Briefly, fibre channel is a switched protocol that allows concurrent communication among workstations, super computers and various peripherals. The total bandwidth provided by fibre channel network can scale to the order of a terabit per second. A fibre channel link is capable of transmitting frames at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fibre and copper cable.

FIG. 1 illustrates a variable-length frame 11 as described by the fibre channel standard. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

FIG. 2 illustrates a block diagram of representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e. a collection of fibre channel switches). The fabric 110 is an entity that interconnects various node-ports (N-ports) 140 and their associated workstations, mainframes and peripherals attached to the fabric 110 through the F-ports 142. The essential function of the fabric 110 is to receive frames of data from a source N-port and, using a first protocol, route the frames to a destination N-port. The first protocol is, e.g., the fibre channel protocol.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or single fibre channel switch to connect devices. The fabric includes a plurality of fabric-ports (F-ports) that provide for interconnection and frame transfer between a plurality of node-ports (N-ports) attached to associated devices that may include workstations, super computers and/or peripherals. The fabric has the capability of routing frames based upon information contained within the frames. The N-port manages the simple point-to-point connection between itself and the fabric. The type of N-port and associated device dictates the rate that the N-port transmits and receives data to and from the fabric. Transmission is isolated from the control protocol so that different topologies (e.g., point-to-point links, rings, cross point switches) can be implemented.

The fibre channel industry standard also provides for several different types of data transfers. A class 1 transfer requires circuit switching, i.e., a reserved data path through the network switch, and generally involves the transfer of more than one frame, oftentimes numerous frames, between two identified network elements. In contrast, a class 2 transfer requires allocation of a path through the network switch for each transfer of a single frame from one network element to another.

SUMMARY OF THE INVENTION

With the advent of widespread use of fibre channel protocols, it has become an issue whether directors that could accept only native Enterprise System Connection Architecture (ESCON®) connections should be replaced or refurbished so as to accommodate fibre channel signals. That is, the market has a need to transfer from ESCON to fibre channel since many users have a product that was originally designed for one utility (ESCON) and now have a need for greater functionality. Preservation of serial number is very important in this industry (ie. as a capital asset) and there is a lot of value to a product or method that is capable of sending and receiving both ESCON and fibre channel data in same switch. Thus, it is desirable to obtain a multi-protocol channel switch that provides both a true ESCON traffic traversing switch as well as a true fibre channel traffic traversing switch, wherein frames from one protocol are never intermixed with any other protocol.

This was previously thought to be difficult, inter alia, because in ESCON switches, the part of the switch that houses operating code is generally completely taken up; that is, it was thought that there was no room to store code for the new processor type. High availability systems require nondisruptive code load. In addition, in order to modify ESCON switches to accept fibre channel data, it was believed that adaptations of ESCON would disrupt the fibre channel transmission.

Accordingly, an embodiment of a fibre channel port adapter (FCPA) can be installed into a multi-protocol channel switch. The FCPA connects to the open system fibre channel standard and allows the multi-protocol channel switch to act as a part of the fabric topology in the fibre channel standard. This permits devices using fibre channel, called N_Ports, or NL_Ports, to utilize the multi-protocol channel switch through one FCPA or multiple FCPAs and implement a fabric topology. This topology allows an "any-to-any" connection between devices using fibre channel. This any-to-any connection is provided through one or more FCPAs, interconnected through a crosspoint switch (CPSW) of the multi-protocol channel switch.

Fibre channel is an open standard, and the FCPA allows the switched (fabric) topology to utilize the CPSW of the multi-protocol channel switch and provide this open system among FCPAs, independent of ESCON related interfaces in the multi-protocol channel switch.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
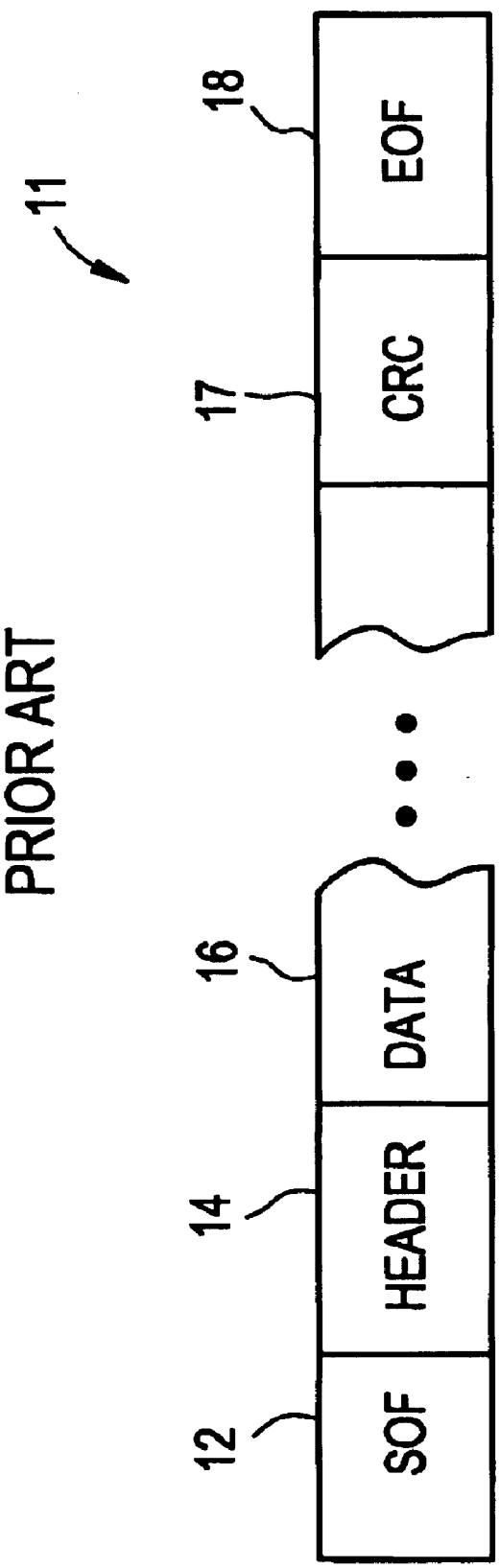
FIG. 1 illustrates a variable-length frame as described by the fibre channel standard.
Figure 2:
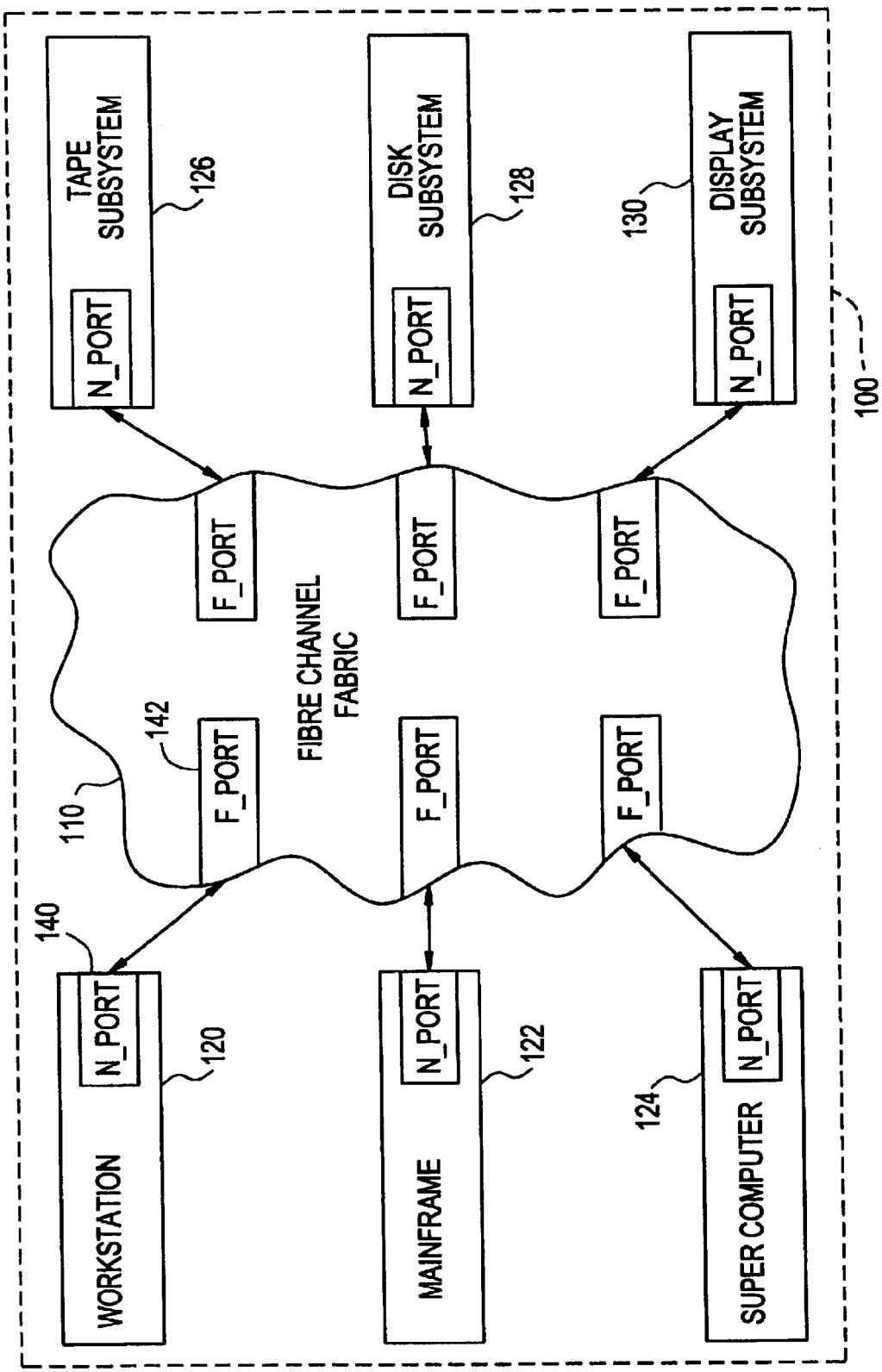
FIG. 2 illustrates a block diagram of a representative fibre channel architecture in a fibre channel network.
Figure 3:
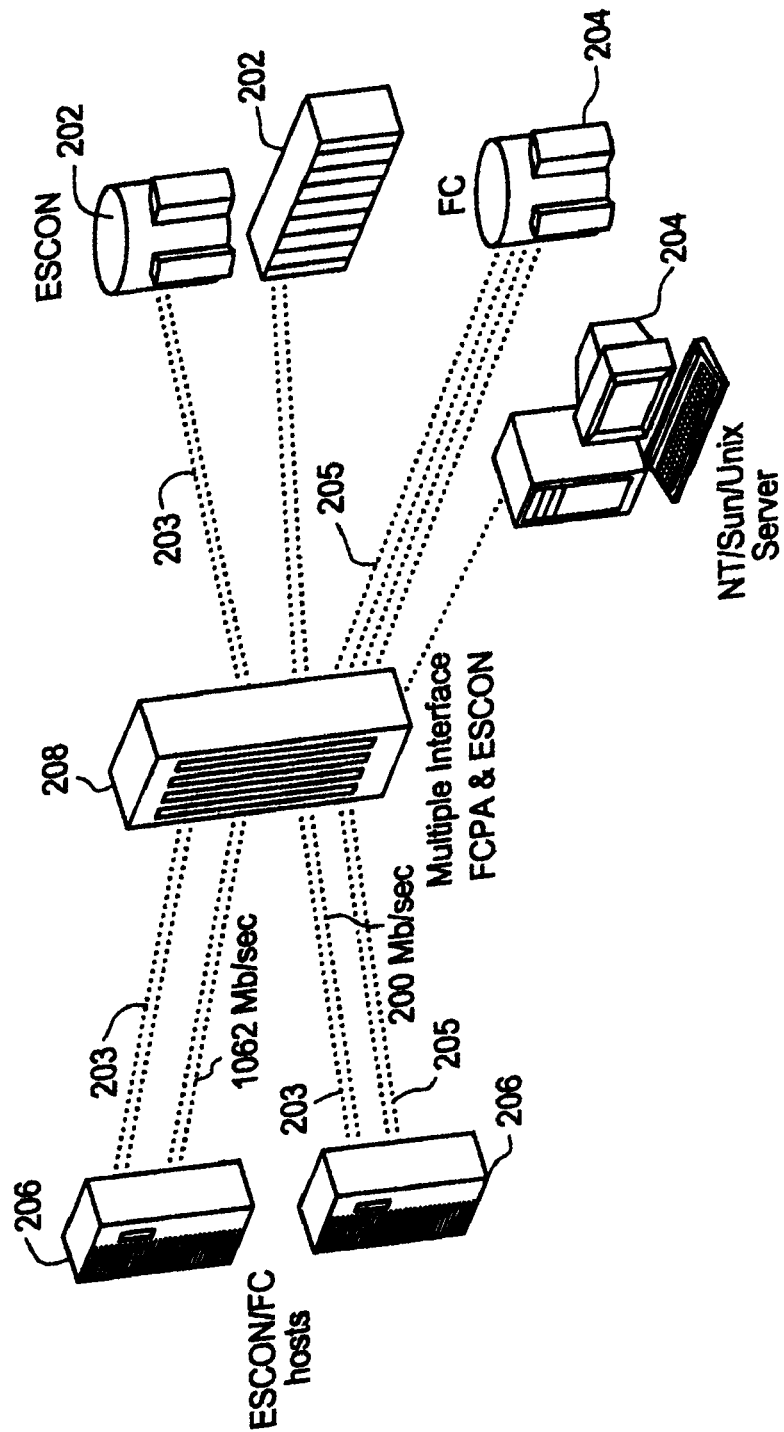
FIG. 3 illustrates a block diagram of a multi-protocol switch network configuration.

Referring to FIG. 3, a network configuration of the present approach includes ESCON supported systems 202, native fibre channel supported systems 204, and mixed ESCON/fibre channel supported systems 206 interconnected to a multi-protocol switch 208 using ESCON connections 203 and fibre channel connections 205.

Figure 4:
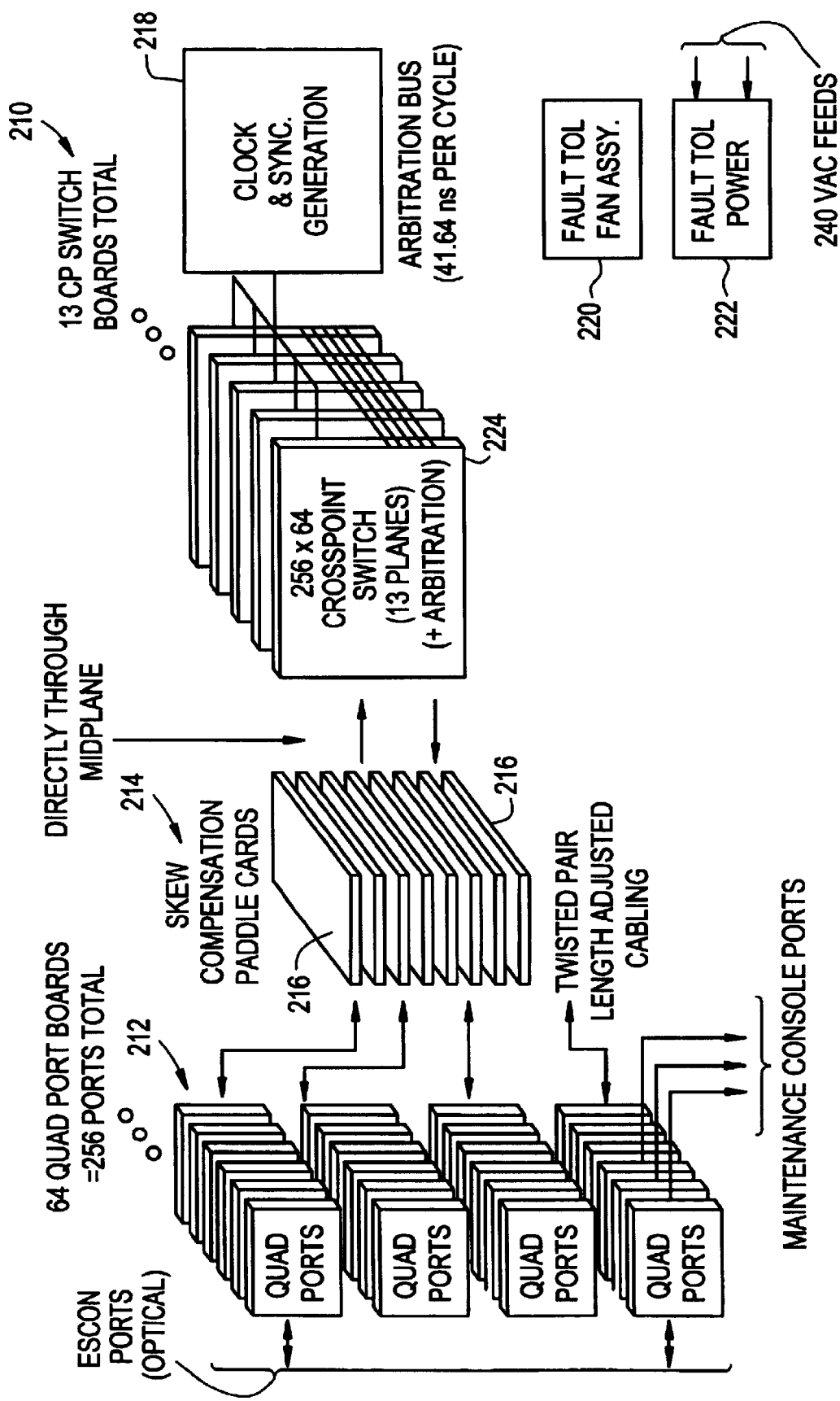
FIG. 4 illustrates a block diagram of a channel director.

Referring to FIG. 4, there is shown a fault tolerant channel director 210 that includes crosspoint switch fabric or assembly 224 as disclosed in U.S. Pat. No. 5,805,614 incorporated herein by reference in its entirety. The channel director 210 is capable of employing any-to-any, point-to-point switching and can make millions of physical connections, dedicated or dynamic, between channels and control units every second. For example, the channel director 210 shown in FIG. 4 is designed for an Enterprise System Connection Architecture (ESCON) and has 256 optical port capacity to support as many as 125 ESCON connections simultaneously, without contention, when the system is configured as a single unit. The channel director 210 may also be subdivided into two or more sub-directors, each having a proportional number of ports. Also, groups of the ports are time division multiplexed ("TDM") into higher bandwidth parallel paths going to crosspoint switch fabric 224 and, thus, the crosspoint switch fabric is designed to handle TDM data.

In particular, the channel director 210 includes a set of quad port adapters 212, a cable interconnect 214, a centralized clock and sync generator 218, a fault tolerant fan assembly 220 and a fault tolerant power supply 222 in addition to the crosspoint switch fabric or assembly 224. Each of the quad port adapters 212 handles four ESCON ports at 200 Mb/s per port and is interconnected to the cable interconnect 214. The cable interconnect is interconnected between the quad port adapters 212 and the crosspoint switch fabric 224 and uses twisted pair IDC terminated ribbon with skew compensation paddle cards 216. By adjusting their line lengths, the skew compensation paddle cards 216 are used to consolidate the individual bits of a 13-bit byte into a de-skewed collection of data/clock information passing between the quad port adapters 212 and the crosspoint switch fabric 224. The centralized clock and sync generator 218 provides a common clock to all boards of the crosspoint switch fabric 224. Also, consistent with the fault tolerant design of the channel director 210, a redundant scheme is applied for the fan assembly 220 and the power supply 222.

As shown in FIG. 4, the crosspoint switch fabric 224 is a combination crosspoint switch and arbitration fabric that is implemented across a plurality of crosspoint switch planes or boards.

By installing a fibre channel port adapter (FCPA) of the present invention into the channel director 210, a multi-protocol switch is provided. In particular, an embodiment of an FCPA described further herein provides a two-board set which installs into any two adjacent quad port adapter slots of the channel director 210.

An embodiment of the FCPA allows up to four, full speed fibre channel serial interfaces to connect through the multi-protocol channel switch to other FCPAs or to ports on the same FCPA. The FCPA embodiment takes up two ESCON port adapter slots in the multi-protocol channel switch so that data rate bandwidth can be maintained. This bandwidth is generally limited to the maximum rate that the crosspoint switch can provide, which is generally 84 MB/s per full duplex per adapter slot.

According to the present apparatus, it is possible to employ "on the fly code load" as opposed to stopping and replacing the entire code due to space constraints in existing equipment. As such, according to the present apparatus, it is possible to pass on each code piece incrementally so as to provide a new and improved way of providing nondisruptive code load.

In addition, the present apparatus provides interface logic that is capable of converting data from a low level fibre channel protocol into a hardware interface that an existing multi-protocol channel switch can understand. Since there is address translation, in order to get the information to traverse the system, the added interface creates geographical address translation to and from fibre channel addressing.

Furthermore, since use of the FCPA can remove some amount of the storage in the native device, an alternative storage mechanism is provided so that when a new board is plugged in the correct data will be transferred. That is, according to the present apparatus, there is provided a new card that does not need to be reprogrammed. This is because the data is stored in nonvolatile memory. When a new board is plugged in, one must ensure that the new board does not try and act on its own nonvolatile memory data relevant only to its last place of installation. Since most information is stored directly in the channel switch, the FCPA provides a means for identifying the appropriateness of the firmware built into the system, and in addition, is capable of downloading a suitable configuration. Moreover, two control systems are provided. This is because, inter alia, certain design information in the channel switch must be disabled to avoid damaging the other protocol. Thus, a novel mechanism is provided for polling and updating to ensure no data is mistranslated which employs two control systems, which are design to remained synchronized with each other. There is also provided a mechanism for updating the existing diagnostics program of the channel switch to accommodate the testing of new hardware.

The use of the term "Fabric" is perhaps a poor choice of words in discussing fibre channel terminology in relation to the multi-protocol channel switch. The term "fabric" in fibre channel is used to represent some general architecture that allows any-to-any connection between N_Ports. This "Fabric" could be made up of many "switches," since a switch is the smallest switch topology entity that has the attributes of a Fabric. With respect to the multi-protocol channel switch, we use the term "fabric" to denote the CPSW boards. To eliminate ambiguity, from this point onward, the switching mechanism in the multi-protocol channel switch is called "crosspoint," to provide an unambiguous term related to fibre channel discussions in general and the FCPA in particular.

The fibre channel system is an open system. Based on the specifications for this open system, any equipment that adheres to the specifications and is compatible can, theoretically, be connected together and exchange information.

There are three topologies developed within fibre channel:
1. Point-to-point
2. Fabric
3. Arbitrated Loop Of the three topologies, point-to-point is used to connect two N_Ports. It has no meaning for the FCPA, and will not be mentioned again. However, the FCPA can be a part of the fabric or loop topologies. In either case, the FCPA can both provide multiple F_Ports and be a part of the fabric topology, or support at least one FL_Port, which would be a member of an arbitrated loop.

The multi-protocol channel switch, in combination with multiple FCPAs, can provide one or multiple "switches", which are the building blocks of the fabric technology. At a minimum, the multi-protocol channel switch, populated with FCPAs, could be configured and initialized as a single fabric.

As a part of a larger fabric or as a small, four-port switch, the FCPA provides the any-to-any connectivity of the fabric topology. When one of its ports is a FL_Port, that port of an FCPA can act as the switch member of an arbitrated loop. The FL_Port can provide a gateway between the loop and other N_Ports in fibre channel (this produces what is called a public loop).

The FCPA is also capable of providing additional loop support. The FCPA has the functionality to plug into a private loop, which normally contains no FL_Ports. This port type has two modes: Segmented Loop (SL_Port) and Translated Loop (TL_Port). The SL_Port allows several smaller private loops to be connected through the FCPA to create a bigger loop. This allows better speed and reliability than a typical private loop because the loops can still act as separate loops or one big loop. The TL_Port allows devices that contain public or private loop support to interface with ports that contain private loop support only. With this type of port, newer servers that contain private and public loop support can communicate with older DASD that contain private loop support only.

The FCPA provides, in combination with the multi-protocol channel switch or by itself within four ports, "any-to-any" connections between N_Ports in a switched environment or between NL_Ports in a public loop. This allows systems to interconnect servers, peripheral systems, etc. in an efficient manner to allow multiple paths for information transfer.

The FCPA provides the service of a fabric or public arbitrated loop topology in fibre channel. The current switch control system is preferably capable of being expanded to utilize LANs and standard protocols to control and maintain the FCPA and the multi-protocol channel switch that contains FCPAs.

To participate in the open system of fibre channel, the FCPA supports the fibre channel FC-SW-2 standards. The FCPA is preferably capable of supporting the current and future classes of service and fibre channel servers needed for loop and fabric topologies.

The FCPA is a two-board set that utilizes the multi-protocol channel switch as a crosspoint to connect one to four fibre channel ports to any other fibre channel ports. These "any other" fibre channel ports can be on the same FCPA or on another FCPA. If the "any other" port is on another FCPA, the multi-protocol channel switch crosspoint is used to allow information to pass between the FCPAs.

The one to four fibre channel connections on the FCPA act as either F_Ports, FL_Ports or E_Ports in the fibre channel system. F_Ports connect to N_Ports in fibre channel. N_Ports are the ports that exist in equipment that would use the FCPA to communicate between two N_Ports. Typically, these N_Ports are located in equipment. N_Ports are used with the FCPA (or multiple FCPAs) in the fabric topology of fibre channel.

FL_Ports also connect to equipment, but in this case connect to NL_Ports in the arbitrated loop topology of fibre channel. In this topology, one FL_Port, on one FCPA, is connected in one arbitrated loop, along with up to 126 NL_Ports.

E_Ports use fibre channel links to connect switches together to create a larger switching fabric.

The FCPA can handle full speed fibre channel information rates on each of the four ports. This rate is advantageously typically about 1.0625 Gb/s. Between any two ports on one FCPA, this is often the maximum rate. Because of the upper limit performance of the multi-protocol channel switch crosspoint, the maximum information rate between F_Ports on two separate FCPAs is typically 840 Mb/s. However, because of the fibre channel classes of service that are handled through the crosspoint buffer full frames at the destination FCPA, FCPAs communicating through the crosspoint are still able to handle the full speed fibre channel data rate of typically 100 MB/s. This results in a higher latency of the data in reaching the destination N_Port of any transfer.

Figure 5:
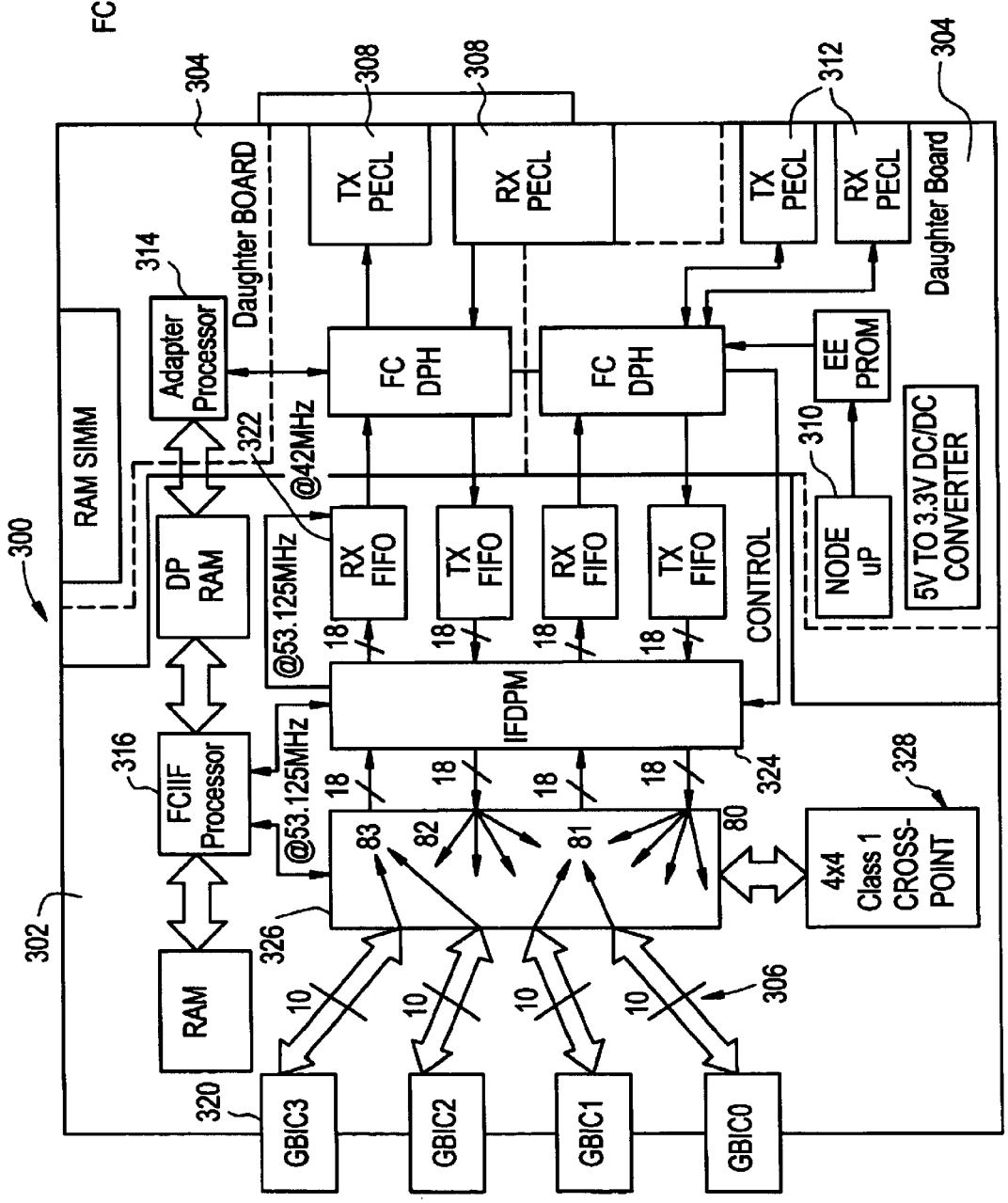
FIG. 5 is a block diagram of an FCPA according to the present invention.

Referring to FIG. 5, a block diagram of an FCPA 300 is shown. The two-board FCPA set provides connections to four bi-directional fibre channel links, for example, either with copper or optical media. On the main board 302 of the two-board set is located a fibre channel "front end" 306 that connects to the media and provides the buffered data for the multi-protocol channel switch crosspoint. This board also contains one 308 of the two interfaces to the crosspoint, in addition to a processor 316 that controls the fibre channel "front end". The second board 304 contains the second interface 312 to the crosspoint, in addition to an adapter processor 314 and a node processor 318 for the two-board set. Connections between the two boards provide for power and data signals to pass between the two boards. The two boards are treated as a board set.

The switch control system for the channel director 210 (FIG. 4) is updated to support the FCPA maintenance operations including chassis activation. Operational control of FCPA ports can be provided for example, by a web based FC Java App as known in the industry, which provides a common control system for a group of fibre channel switch offerings. Note that throughout this disclosure, the FC Java App will be referred to specifically. However, it is understood that other suitable applications can be substituted if desired for any reason. The FCPA also supports the appropriate fibre channel servers to allow the FCPA to configure and operate in the fibre channel environment.

As noted above, the FCPA, as a two-board set, plugs into two adjacent ESCON port adapter slots in the multi-protocol channel switch. As mentioned previously, the FCPA comprises two boards, a main board 302 and a smaller daughter board 304, that are semi-permanently attached. Each board has a connector that plugs into the backplane in the multi-protocol channel switch.

The connection to the fibre channel physical media can be done for example, through up to four gigabit interface converters (GBICs) 320. These are fibre channel (and de facto industry) standard interfaces that allow for hot swapping and field replacement of the media connection on the FCPA. They also allow various media types to be used without changing the FCPA. Only the GBIC changes. The connection from the GBIC to the FCPA main board is the same, no matter what media type is used. The GBIC determines the type of media, and consequently the speed and distance, that are used to connect another fibre channel device.

The FCPA has two "sides", for discussion purposes, the media side and the crosspoint switch side. The media side connects in a bi-directional mode to the industry standard fibre channel serial communication system. This system utilizes fibre optic or copper media to communicate between equipment at rates up to 1.0625 Gb/s. The crosspoint side of the FCPA allows connections between FCPAs, to provide the fabric (i.e., switched) topology in the fibre channel System. The multi-protocol channel switch therefore becomes a switch, or possibly multiple switches, in the fibre channel fabric.

The FCPA, when installed in the multi-protocol channel switch, allows a fibre channel interface on the board set to communicate with another fibre channel interface on the same board set or through the crosspoint of the multi-protocol channel switch to a fibre channel interface on another FCPA. Because of protocol incompatibility, fibre channel interfaces do not communicate to ESCON port adapters and vice versa. The FCPAs in a multi-protocol channel switch form a separate switch (or switches) in the fibre channel world as a separate and distinct entity in the multi-protocol channel switch.

The FCPA uses the fibre channel standard to allow communication between equipment through one or more FCPAs. The FCPA performs this communication function through the fabric topology of fibre channel. The FCPA uses crosspoint switches (one or many) to provide an "any-to-any" connection between equipment through one or more FCPAs in the multi-protocol channel switch.

Equipment can have any of the defined fibre channel interfaces such as: N_Port, NL_Port, or E_Port. An N_Port is used to connect directly to one of the ports, called an F_Port, on an FCPA. This allows the initiating N_Port to communicate to other N_Ports via two FCPA F_Ports in the multi-protocol channel switch. These two F_Ports can be on the same FCPA or on different FCPAs, thereby using the crosspoint to pass information between the two F_Ports in the latter case.

Equipment can also be connected to an FCPA through the loop topology of fibre channel. In this variation, one port of an FCPA acts as an FL_Port, and connects to one or more NL_Ports as part of an arbitrated loop in fibre channel. This loop can have for example, up to 127 active members, in which case one and only one port of an FCPA can be one of the members of the arbitrated loop. Information can be passed among the members of the loop. This is called a "public loop". In this type of loop, information can not only be passed around the loop, but can be passed to/from the loop from/to other F_Ports. These F_Ports, which are connected to N_Ports, can be on the same or another FCPA. It is the N_Ports that communicate through the FL_Port to NL_Ports on the "public loop". With the TL_Ports, the FCPA module can be connected to private loops of for example, up to 127 active members. With the SL_Ports, FCPA ports can be connected to one or more FL_Ports to create a connection between one or more loop segments. Each loop segment communicates between its own loop ports and across the fabric to other loop segments as required. The third type of port that equipment may support is the E_Port. This interface is used when cascading fibre channel switches. The FCPA port and the port that are linked together discover that each is a switch port and configure themselves as E_Ports. Systems integrators use this capability to build large fabrics.

To support the above operations and topologies in fibre channel, the FCPA supports the applicable content in the following fibre channel standards:

1. FC-PH (Physical and Signaling Interface)
2. FC-PH2 (Physical and Signaling Interface 2)
3. FC-PH3 (Physical and Signaling Interface 3)
4. FC-SW (fibre channel switch)
5. FC-AL (Arbitrated Loop)
6. FC-AL2 (Arbitrated Loop 2)
7. FC-FG (Fabric Generic)
8. FC-GS (Fabric Generic Services)

These standards fully define the protocols and algorithms needed to connect to equipment that likewise follows these standards.

Embedded firmware in two processors, the fibre channel interface processor 316 and the adapter processor 314, control the operation on a single FCPA. The node processor 318 is used to connect to and communicate over the CAN Bus to the CSM NP. Hardware is used to establish a route through the crosspoint to allow information to pass through the crosspoint between FCPAs. For maintenance, status and other communication, the fibre channel interface processor preferably communicates only with the adapter processor. The adapter processor transfers information from/to the node processor for maintenance and status purposes.

As noted above, the fibre channel interface processor 316 controls and supports the "front end" of the FCPA, providing control of the data path from the media links through FIFO memories 322 that connect to the multi-protocol channel switch crosspoint interface 308, 312 on the FCPA. Any routing of information within the four ports on an FCPA is totally controlled through the fibre channel interface processor, with only status information on this routing being passed to the switch interface.

To maintain the same level of control and to provide a similar interface to the rest of the multi-protocol channel switch, the adapter processor 314 controls the bi-directional data path from the FIFO memories 322 through the crosspoint interface.

The switch control system provides a mechanism to provide maintenance and status reporting services for the FCPA. The switch control system provides for firmware download, alarm reporting and maintenance of the FCPA in the fibre channel environment. Port level control is provided from the FC JAVA App.

Faults at the FCPA level are reported through to the switch control system, and can be displayed, for example, as status on the FCPA via LED indicators. Board operational status also is optionally displayed via indicators on the front of the FCPA board set.

As noted above, the fibre channel interface provides the fibre channel front end for the FCPA and executes the lower layers of the fibre channel protocol (FC0, FC1, & FC2) which comprise the fibre channel FC-PH specification to provide classes 1, 2, 3 and Intermix routing services. This logic includes the following components: link interface 320, fibre channel interface switch 326, fibre channel interface processor 316, interprocessor communication hardware, IFDPM, and fibre channel crosspoint switch 328. The fibre channel interface contains two interfaces to the other half of the card. One interface is the InterFabric Data Path Manager (IFDPM)324 that controls the flow of frames between the two interfaces. The second interface is used for interprocessor communication between the fibre channel interface processor 316 and the adapter processor 314.

Figure 6:
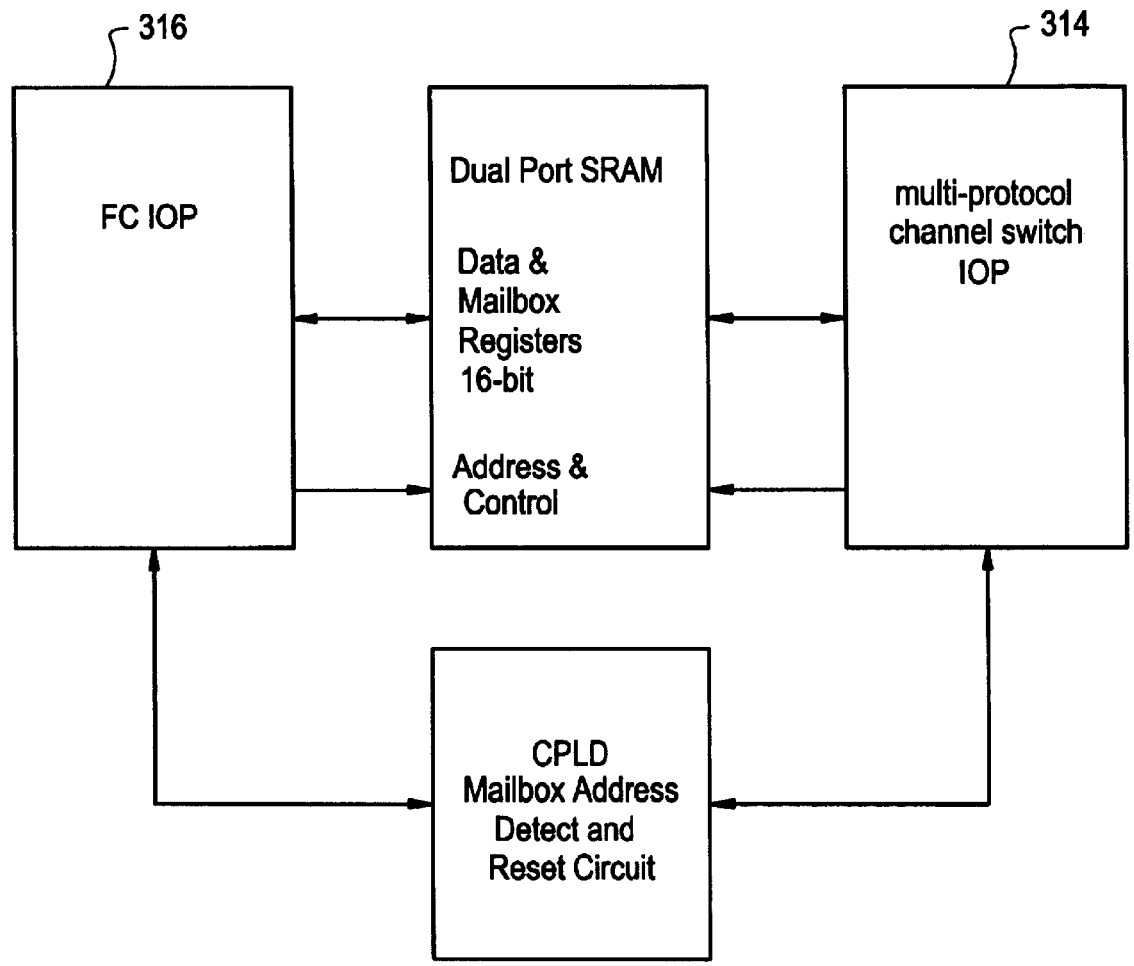
FIG. 6 is a block diagram of interprocessor communications according to the present invention.

The fibre channel interface processor 316 on the mother card provides the following management functions:

Fabric Login Processing
Exception Processing (issuing of Busy and Reject frames)
Configuration of hardware steering table
Alarm Reporting
Diagnostics Execution
JAVA App Interface
Switch Interface An inter-processor communications path is primarily used to support the transfer of switch utility messages between the fibre channel interface processor 316 and the adapter processor 314. This includes such items as configuration, alarm/alert reporting, and diagnostic information. FIG. 6 illustrates this path.

Separate queues exist in the SRAM for data passing in each direction. Separate mailbox registers are also generally included to indicate message present conditions in each direction. When a processor has information to be transferred, it loads its queue with the data and then writes to the mailbox address that generates an interrupt to the other processor. The receiving processor detects the interrupt and proceeds to read the mailbox address. This negates the interrupt. The receiving processor then reads the entire message out of the SRAM.

Referring again to FIG. 5, the link interface executes the physical layer of the protocol (FC0). It preferably contains 4 GBICs (one per port) which transmit the data at advantageous 1.0625 Gb/s. Various types of GBICs can be inserted into this interface depending on the customer's requirements. Each type is distinguished by the medium for the link. Thus, copper, long wave (single mode) optical, and short wave (multi-mode) optical GBICs can be used for this interface if desired. Each type of GBIC accepts the serial electrical data and converts it to the required signal type (electrical or optical) at the required link rate.

The transmission layer (FC1) requires that the data that is sent to the physical interface preferably to be encoded into an 8 B/10 B format. The link interface accomplishes this by known techniques to provide the required encoding. For transmission, it accepts the 8 bit wide data and converts it to serially encoded data. For reception, it accepts the 10 bit encoded data that is in a serial format, decodes the data, and converts it to the parallel 8 bit wide format. The link interface also preferably recovers the receive clock which is used to sample the 8 bit wide data.

The link interface provides the buffering for buffer to buffer credit management. The fibre channel interface switch 326 preferably contains enough buffering to store 8 maximum sized frames. This means that the fibre channel interface switch provides up to 8 credits for buffer to buffer credit management. This results in the FCPAs ability to be linked with an N port up to a maximum distance of, for example, 16 Km. Additional buffering that is external to the fibre channel interface increases the number of credits to 50, resulting in a link distance of 100 Km between the FCPA and an N port.

The fibre channel interface switch 326, fibre channel interface processor 316, and crosspoint switch 328 accomplish layer FC2 of the fibre channel protocol that is the signaling and framing layer. This layer provides the ability to route frames between N Ports through the switch. It does this by allowing different classes of routing service depending on the frame that is to be routed. It also contains exception-handling capability for frames that cannot be routed. It accomplishes this by forwarding the frame to the fibre channel interface processor that analyzes the frame and error condition and formulates the correct response. It then routes this response frame through the fibre channel interface switch and out to the link to the N Port that sent the original frame. The fibre channel interface processor accomplishes this exception handling by using several FIFOs, which are illustrated in the block diagram of FIG. 5 and detailed in the paragraphs below.

Frames incoming from the link that are destined for the fibre channel interface processor 316 are routed through the fibre channel interface switch in order to support the external credit mechanism. These frames are not forwarded to the multi-protocol channel switch crosspoint, but are instead moved to the POF (Processor Output FIFO), where they will be read by the fibre channel interface processor. In addition, if there is a timeout while waiting to transmit a frame across the multi-protocol channel switch crosspoint, the frame will be moved to the corresponding (POF) FIFO. Finally, if the multi-protocol channel switch crosspoint rejects a frame (because it is unable to deliver it to the intended destination), then the frame is moved to the corresponding (POF) FIFO.

Frames originating in the fibre channel interface processor, which are intended for other fibre channel interface processors in the same fabric, are not routed through the fibre channel interface switch, as they would then interfere with the external credit mechanism. Instead, they are placed in the single PIF (Processor Input FIFO) device, from where they can be transmitted across the multi-protocol channel switch crosspoint. These frames have priority over normal frames in the BOF (BPORT Output FIFO) devices. This ensures that high-priority inter-processor traffic cannot be blocked (as long as the other fibre channel interface processor is active). Note that the single PIF uses only one of the two transmit paths through the multi-protocol channel switch crosspoint. Since the amount of IOP-IOP traffic is small, this does not constitute an appreciable amount of overhead on the single transmit path. Prioritization only occurs between frames. After TREQ# has been asserted for a frame, that frame is either delivered to the crosspoint or must be rejected or busied by the crosspoint.

Class 1 service, otherwise known as connection oriented service, provides a dedicated link between the N Ports for the duration of the dialog. This service is enabled using crosspoint switch 328. When the fibre channel interface switch 326 recognizes the need for this service due to an incoming frame containing a class 1 Start of Frame Connect delimiter (SOFC1), it forces a connection within the crosspoint switch 328 between the two F Ports on the mother board that are involved. It then routes this frame through the crosspoint logic to the destination port. Succeeding frames are routed between the ports automatically without stopping them for analysis, as in the first frame that was received. When a frame is received from one of the involved ports that contains a class 1 End of Frame Disconnect delimiter (EOFD1), the fibre channel interface switch breaks the connection in the crosspoint switch after routing the frame to its destination. For this service, the fibre channel interface switch typically requires a minimum of 1350 ns to establish the connection within the crosspoint switch and to route the initial frame to its destination. If there is contention for the destination port, this latency is larger. For subsequent frames within the class 1 dialog, the fibre channel interface switch introduces 600 ns of latency to each frame.

Class 2 service, otherwise know as connectionless service, routes frames on an individual basis. This means that the crosspoint logic makes a connection for every received frame and then breaks the connection after the frame is routed. The frame is routed depending on the destination address that is included within the frame. For a frame that is routed to a port on the same motherboard, the fibre channel interface switch routes the frame internally to the destination port. For a frame that is routed to a port on a different FCPA, the frame is sent to the opposite side of the module through the IFDPM 324. For either case, the fibre channel interface switch provides the buffer to buffer acknowledgment (RRDY) for each frame as long as there is space within the internal buffer to accept a new frame. Class 3 service, otherwise known as datagram service, can be handled similarly to class 2 service by the FCPA.

Class ⅔ frames can be routed to other FCPAs contained within the multi-protocol channel switch as well. For these types of frames, the fibre channel interface switch outputs the frame onto its B Port that is used for transferring frames between FCPA modules. The fibre channel switch transforms the 8 bit wide data that is being transferred at 106.25 MB/s into 18 bit wide half words at 53.125 MB/s. This transformation is represented in Table 1.

TABLE 1

Half-Word Format

| Bit # | Definition | |
|---|---|---|
| 17 | Frame Delimiter | 1 = End-of-frame |
| 16 | Parity | half-word odd parity |
| 15:0 | Data | |

The lower 16 bits contains two bytes of data. Bit 16 contains the odd parity bit for the lower 16 bits. Bit 17 indicates that an End of Frame delimiter is detected for the frame. The multi-protocol channel switch interface uses this bit to break the connection after the frame has passed through the destination port.

The fibre channel interface switch performs further processing on the frame by encapsulating it into an extended frame format, which is detailed in Table 2 below. The information pertinent to the multi-protocol channel switch interface is contained in bits 5 through 0 in the first half word. These bits hold the address for the destination of the frame. The multi-protocol channel switch interface proceeds to make a connection within the multi-protocol channel switch crosspoint logic based on this address before transferring the frame to the multi-protocol channel switch crosspoint logic.

TABLE 2

Extended Frame Format

| Half Word # | Definition |
|---|---|
| 0 | Address Phase<br>15:14 Reason Code<br>    00 Rejected (BOF Frame rejected by multi-protocol channel switch Crosspoint)<br>    01 Timeout (BOF Frame timed out)<br>    10 IOP (BOF Frame directed to IOP)<br>    11 Reserved (not used)<br>13:6 Reserved<br>5:0 Destination Port ID<br>    5:4 Quadrant Number (BN)<br>    3:2 Fibre Channel Interface Number (SN)<br>    1:0 Port Number (PN) |
| 1, 2 | EF Header |
| 3–N | FC Header + Optional OHDRS + Optional DDAT |
| N+1, N+2 | CRC |
| N+3, N+4 | EF Trailer |

As can be seen from FIG. 5, frames from the link that are destined for the multi-protocol channel switch interface exit the fibre channel interface switch 326 on one of its B ports. Preferably two B ports are available for sending frames to the switch interface and two are available for receiving frames from the fibre channel interface. Each B port is generally shared by two of the available ports. For an FCPA with two ports in use, each port preferably has exclusive use of its path to the B port and performance is maximized. This is accomplished by choosing ports that do not share paths to and from the multi-protocol channel switch interface. When more than two ports are in use, each pair of ports may contend with each other for access to the B port path.

Frames that are to be routed to distant FCPAs using the multi-protocol channel switch crosspoint logic are accommodated as follows.

Figure 7:
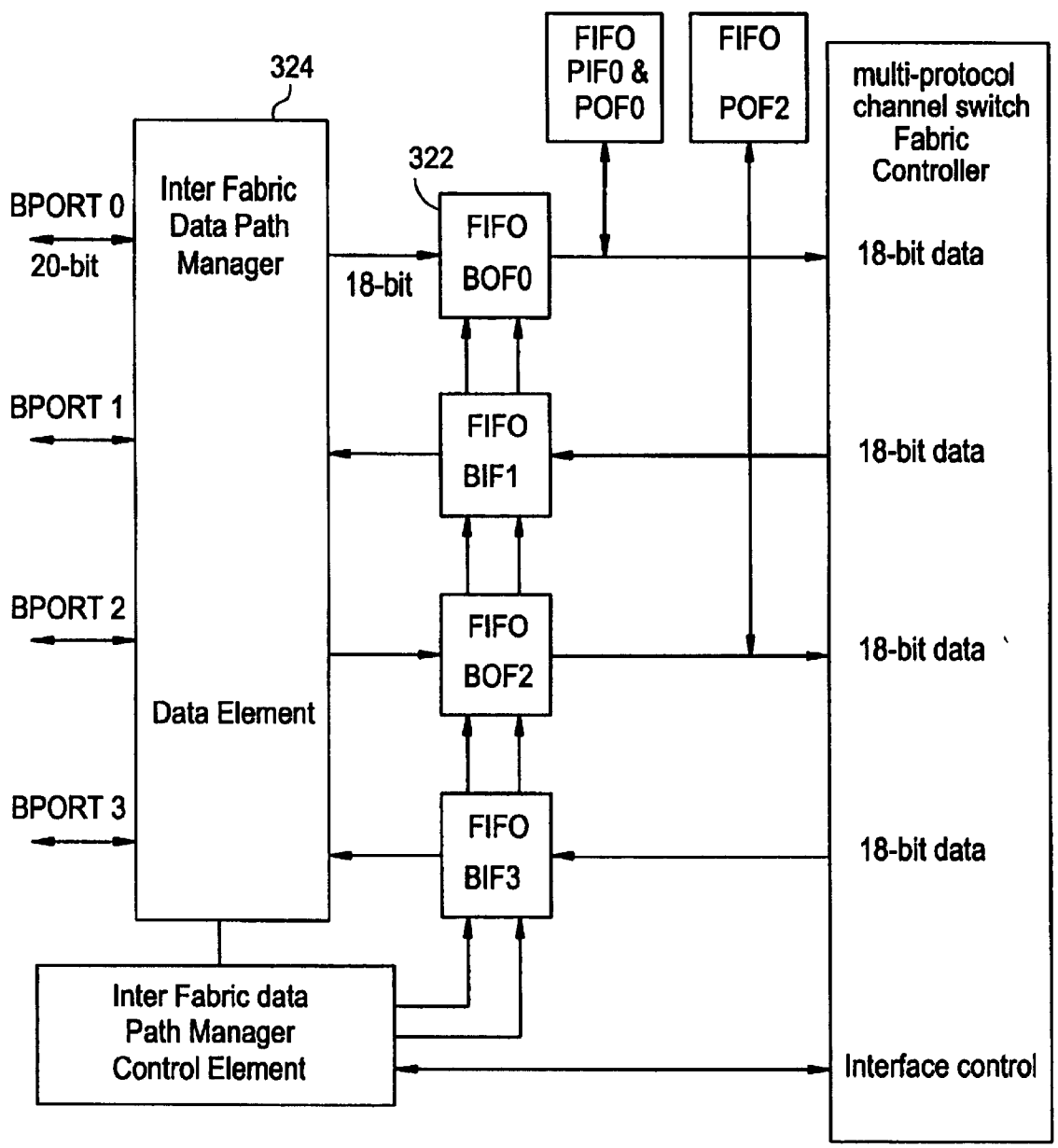
FIG. 7 is a block diagram for an interfabric data path manager according to the present invention.

A block diagram for a typical inter-fabric data path manager is shown in FIG. 7. The inter-fabric data path manager controls the data transfers between the fibre channel switch 326 and the multi-protocol channel switch interface. The IFDPM appears to the fibre channel interface switch as another fibre channel interface switch for frames that are transferred over the BPORT bus. It stores these frames into FIFOs and communicates the frames'existence to the multi-protocol channel switch interface. When the switch interface is able to accept a frame, it signals the IFDPM which releases it to the switch interface. For frames that are coming from the multi-protocol channel switch crosspoint from a different FCPA, the IFDPM receives an indication from the switch interface that a frame is incoming and proceeds to receive the frame into a FIFO. It passes this frame to the fibre channel interface switch over the BPORT bus where it is routed to the correct port and out to the link.

The following signals control the flow of fibre channel frames from the fibre channel interface to the multi-protocol channel switch interface. This occurs when frames are received on the link containing a destination address for a port on a different FCPA or for an FCPA operating in extended mode whereby all frames, regardless of the destination, are sent to the switch interface.

TCLK—Transmit Clock is a free-running clock at 48 MHz that is supplied by the multi-protocol channel switch interface. It is generated from the 96 Mhz clock that the multi-protocol channel switch crosspoint provides to each port card slot. All control and data signals are synchronous to the corresponding port clock.

TREQ—Transmit Request is asserted by the fibre channel interface to signal that a frame is available for transmission across the multi-protocol channel switch crosspoint logic. TREQ is asserted as soon as the first half-word of the frame is available on the bus. This half-word contains the destination address for the frame—as defined in the Extended Data Format shown in Table 2. TREQ remains asserted until the multi-protocol channel switch controller responds with either a bus grant (TGNT) or a negative acknowledge (TNAK), or a timeout condition occurs.

In the event of a timeout, the interface will negate TREQ and will flush the frame to the local fibre channel interface processor for further processing. The timeout value is programmed by the fibre channel interface processor according to fibre channel specifications. In general, if TREQ is negated before the switch interface has issued TGNT, the switch interface ceases to process the frame and cleans up any connections that it may have initiated for that frame.

TNAK—Transmit Negative Acknowledge is asserted by the switch interface to signal that it will not accept the current frame for transmission across the multi-protocol channel switch crosspoint. It should be asserted for one TCLK clock only. TNAK should be asserted by the switch interface if it detects an address parity error or it determines that it cannot deliver the frame to the specified address. The rejected frame will be delivered to the fibre channel interface processor for further corrective action (i.e. sending a reject to the frame originator). TNAK is valid only while TREQ is active. If the switch interface detects a parity error for any word other the address word, it must generate a parity error at the receiving (destination) end so that the receiving logic may take appropriate action.

TGNT—Transmit Grant Port P is asserted by the switch interface to signal that it will accept one half-word for transmission from the fibre channel interface. The switch interface uses this signal to regulate the flow of data across the interface so that the fibre channel frame is sent within the correct time slot for the multi-protocol channel switch crosspoint logic. TGNT is ignored during the period following the end of a frame and until the first word of the next frame is available on the bus. This time is guaranteed to be a least 2 TCLK periods. Due to the pipelined nature of the interface, one additional data word is transferred during the TCLK period following the period in which TGNT is negated (as indicated by TDAV).

TDAV—Transmit Data Available is asserted by the fibre channel interface during any TCLK when a valid half-word is present and the switch interface has previously signaled that it will accept the frame (by asserting TGNT for at least one TCLK). TDAV is automatically negated on the TCLK edge following the final half-word of a frame. Due to the pipelined nature of the interface, TDAV is essentially a shifted version of TGNT (shifted by two clocks), except for the final word of a frame. At the rising TCLK edge at which the final word of a frame is presented, TDAV is negated and remains negated regardless of the state of TNGT, until the start of the next frame.

Figure 8:
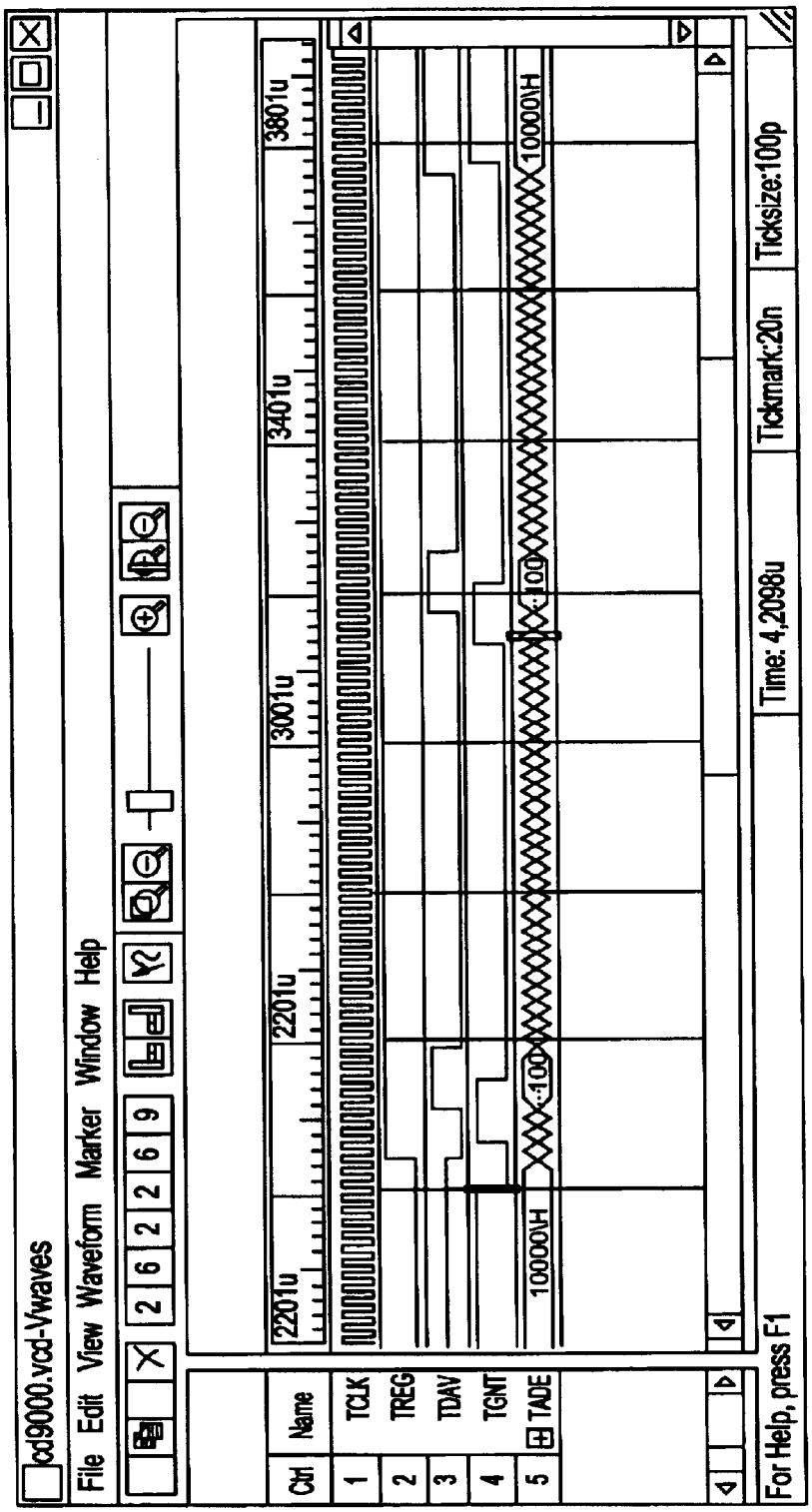
FIG. 8 illustrates how a frame is transferred from a fibre channel interface to a switch interface.

FIG. 8 illustrates how a frame is transferred from the fibre channel interface to the multi-protocol channel switch interface for a frame that has been received from the link. While TREQ is asserted (logical 0), the destination address within the first half word (x10000) is present on the TADB bus. TGNT is asserted (logical 0) after the switch interface has made the connection to the destination port in the multi-protocol channel switch crosspoint logic. TREQ is negated for the rest of the frame after TGNT is asserted. TDAV (logical 0) is asserted for the first valid half word after the destination address and follows the behavior of TGNT thereafter. TGNT throttles the frame by being valid for 28 TCLKs and then being negated for 4 TCLKs. This forces the fibre channel frame into the data time slots for the multi-protocol channel switch crosspoint logic. Once the frame ends, TDAV is negated. TGNT is negated on the detection of the end of frame condition.

The following signals control the flow of fibre channel frames from the multi-protocol channel switch interface to the fibre channel interface. This occurs when frames are received from the multi-protocol channel switch crosspoint logic and are to be transmitted onto the associated port's link. These are frames whose source is a different FCPA.

RCLK—Receive Clock is a free-running clock at 48 MHz that is supplied by the switch interface. It is generated from the 96 MHz clock that the multi-protocol channel switch crosspoint provides to each port card slot. All control and data signals for each of the boards that make up the FCPA module are synchronous to the corresponding clock.

RREQ—Receive Request is asserted by the fibre channel interface to signal that space is available for the reception of a frame from the switch interface. It is asserted only if there is space for a full-frame, i.e. 2166 bytes. If the fibre channel interface determines that it cannot accept a new frame while the present one is being received, this signal is negated after the reception of the final half-word in the present frame.

RGNT—Receive Grant is asserted by the switch interface to signal that it will transfer one half-word from the switch interface at the following rising RCLK edge. A half-word will be transferred from the multi-protocol channel switch crosspoint to the FC Fabric at a rising RCLK edge only if both RREQ and RGNT are active at that RCLK edge.

Figure 9:
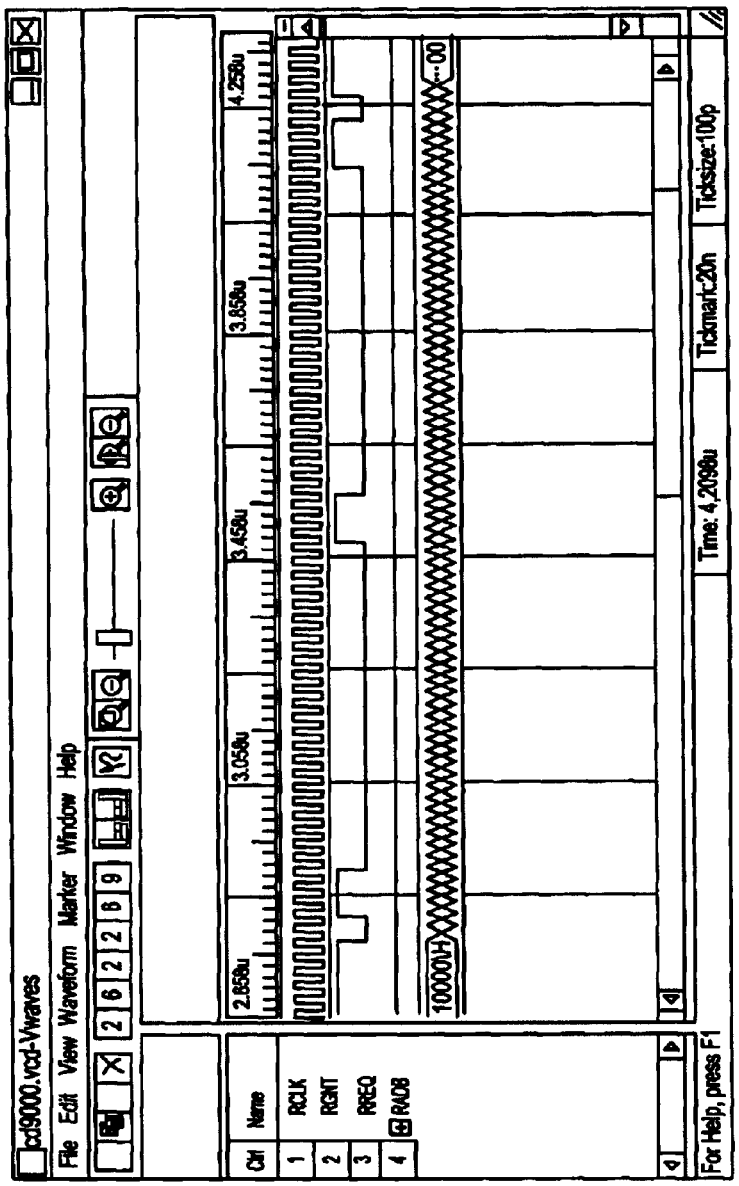
FIG. 9 illustrates a timing diagram according to the present invention.

The timing diagram in FIG. 9 illustrates the method for transmitting frames from the multi-protocol channel switch crosspoint logic to the fibre channel interface. When a frame enters the FCPA from the multi-protocol channel switch crosspoint switching logic, the switch interface asserts RGNT for valid data that is contained on the RADB bus. RGNT throttles the fibre channel frame to the fibre channel interface by asserting RGNT for 28 RCLKs and then negating it for 4 RCLKs. This forces the contents of the data time slots, which contain the fibre channel frame, to be received by the fibre channel interface.

The multi-protocol channel switch interface's primary purpose is to provide the routing path between the source and destination ports within the multi-protocol channel switch crosspoint logic. It accomplishes this by providing an interface to the fibre channel interface as well as an interface to the multi-protocol channel switch crosspoint logic. This logic is duplicated on both the mother and daughter cards, (FIG. 5) i.e. there is a version of this logic for each ESCON port adaptor slot in which an FCPA resides. The basic components that comprise this logic are two PECL ASICs 308, 312 operating in the ESCON port adaptor transmit and ESCON port adaptor Receive modes as well as an FPGA that contains all of the other required functionality. The switch interface also contains logic that enables management functions to occur. This logic consists of the switch interface adapter processor 314, the node processor 318, and associated support logic. Only one version of this logic is required per FCPA module. It resides on the daughter card to allow easy access to the processors when an in-circuit emulator (ICE) is used.

The processors on the daughter card allow the following management functions to occur:

Pass configuration information between the fibre channel interface and the switch interface.

Provide ESCON type control features to the FCPA module from the JAVA App.

Communicate management information with other FCPAs through the multi-protocol channel switch crosspoint logic.

Communicate status and errors to the switch control system through the internal CAN bus.

Configure on-board programmable parts.

Run diagnostics.

Configure the logical to physical address mapping within the hardware.

The flow of frames from the fibre channel interface, through the switch interface, and out to the multi-protocol channel switch crosspoint logic is now described. To control this flow, the switch interface has to manipulate the data into a format that the multi-protocol channel switch crosspoint logic understands. It also has to manage the multi-protocol channel switch crosspoint logic in routing the frames to the destination port.

The multi-protocol channel switch crosspoint logic accepts data that is represented in an internal switch format, which is shown in Table 3 below. The upper four bits (12:9) contain Hamming information that allows single bit errors to be corrected without loss of data. Bit 8 indicates the type of data present in the lower 8 bits of the 13 bit word. If it is a logical 1, the lower 8 bits contain a data character. If it is a logical 0, the lower 8 bits contain a control character. Examples of this latter type are the defined 8 b/10 b control characters such as a K28.5. Only a small number of control characters are defined in the 8 b/10 b specification (not all 128 possible combinations are used). The multi-protocol channel switch takes advantage of this by defining some unique control characters such as the Sync byte (000000001).

TABLE 3

Internal Switch Word Format

| Bit # | Definition | |
|---|---|---|
| 12:9 | Hamming | |
| 8 | Character Type | 1 = Data, 0 = Control |
| 7:0 | Data | |

The fibre channel interfaces sends the data to the switch interface in its own format, as illustrated in Table 1 above. Therefore, the formatted data needs to be transformed into the internal switch formatted data. The fibre channel formatted half word contains a parity bit while the internal formatted word does not contain parity. For mainstream systems, parity is used for error detection and is passed with its associated data to its destination. Since the multi-protocol channel switch provides error detection and correction through use of the hamming bits, the switch interface takes a different approach for parity.

The lower 16 bits of the Fiber channel half words with good parity are demultiplexed into two 8 bytes, the four hamming bits are inserted into bits 12:9 of each word for error detection and correction, and bit 8 is always set to a logical 1. These words are sent to the multi-protocol channel switch crosspoint logic at a rate of 96 Mhz which is 2×the rate that the Fiber channel half words are received (48 Mhz). To the switch interface, all extended frame data with good parity is passed through the multi-protocol channel switch crosspoint logic as data characters.

As indicated previously, bad parity detected in the first half word causes the switch interface to issue TNAK to the fibre channel interface, causing the frame to be discarded. If bad parity is detected for any other half word in the frame, the relevant half word is replaced with two characters. The first is a x100 character (9 bits wide, not including hamming bits) that indicates this is a data word of x00. The second character is a special character that conforms to the internal format for the data. This special character is one of several that are used within the multi-protocol channel switch for various purposes. This special character is defined to be x0aa (9 bit wide, not including the hamming bits). When the destination port detects the special character, it replaces it with a fibre channel formatted half word that contains bad parity. The fibre channel interface switch detects this bad parity and initiates the correct handling of this exception.

Figure 10:
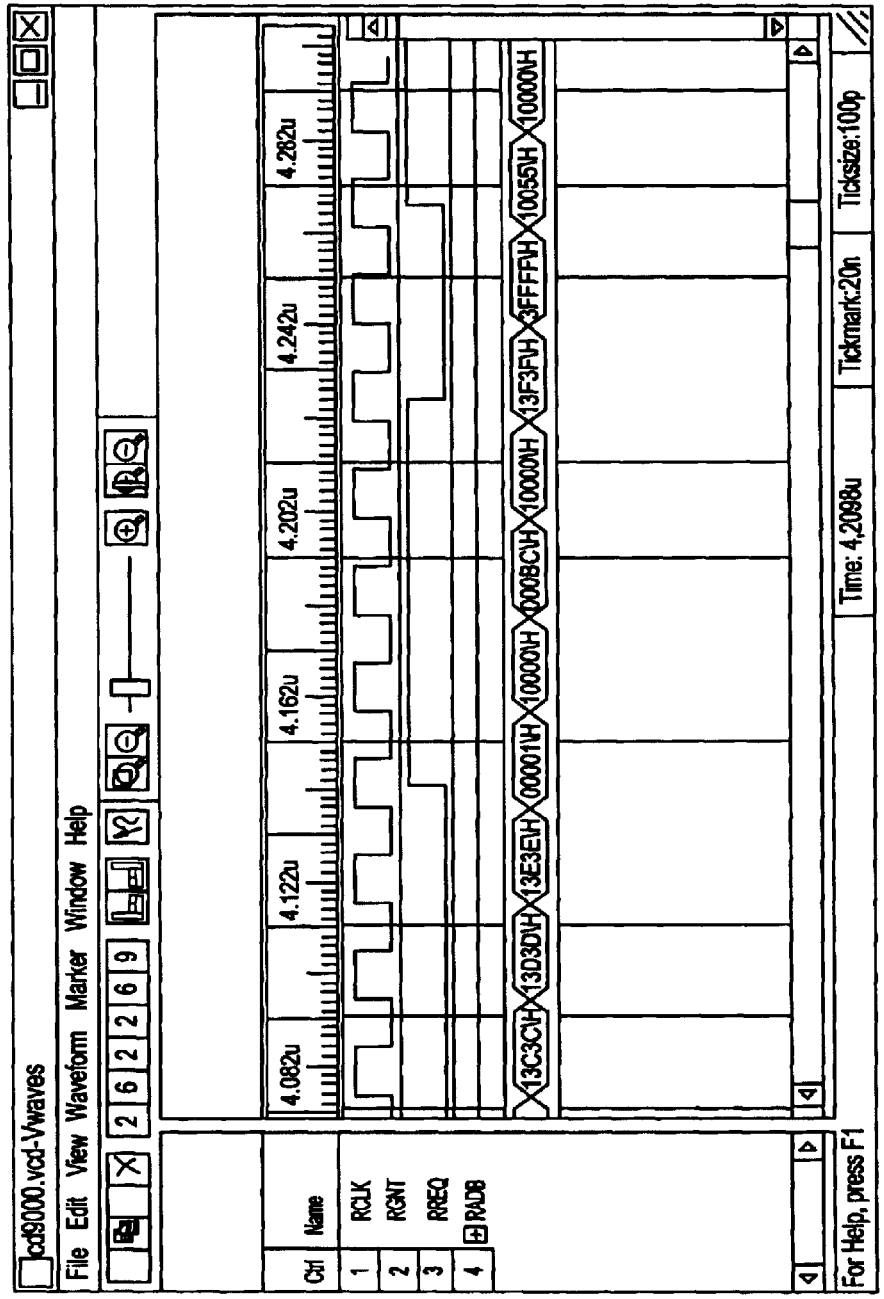
FIG. 10 shows the functions of a control character according to the present invention.

The end of frame indication is converted into a new control character that is appended to the end of the frame. This control character (x055) is used by the destination port to signal the end of the frame and to regenerate the frame delimiter indication in the previous half word. This control character is shown in FIG. 10. The character is appended to the end of the extended frame at the transmitting FCPA. The receiving FCPA uses it to generate the EOF character within the last half word of the extended frame.

As can be seen by the timing diagram, this extra character is available on the RADB bus but is not received by the fibre channel interface due to RGNT being negated for this character.

The data that is sent to the multi-protocol channel switch crosspoint logic is formatted into an internal Frame format. Table 4, which represents this format, is shown below. The frame allows control information to be transmitted in-line with the data such that a separate control path is not needed. The data is transmitted at a 96 MHz rate that provides enough bandwidth for the control information to be sent without affecting the performance of the data transmission.

TABLE 4

TDM Frame Format

| Word # | Definition |
|---|---|
| 0 | Sync |
| 1, 3 | Not used |
| 2 | Message Validity x1FF = Message Valid, x000 = Message Invalid |
| 4–7 | Message |
| 8–63 | Data |

The sync word (0) is used to synchronize the entire system. A Sync signal originates from the Clock Sync generator of FIG. 4, causing the crosspoint switch cards to output the sync word. Therefore, every port card in the multi-protocol channel switch is transmitting or receiving this byte simultaneously. The message validity word (2), when set to a value of x1FF, indicates that the 4 words occupying positions 4–7 contain a valid message. The last 56 positions are occupied by the data, which consists of the fibre channel frame from the fibre channel interface. This TDM cycle preferably repeats itself every 64 clocks regardless of the availability of data or control information to be sent.

Since the fibre channel frame partially occupies the TDM frame, the fibre channel frame is throttled by the switch interface as it is read out of the fibre channel interface. This is accomplished by the switch interface negating TGNT during the first 8 positions of the TDM frame such that no data is read out of the fibre channel interface for 8 clock cycles. TGNT is then asserted for the next 56 positions of the frame. This forces the fibre channel frame into the data portion of the TDM frame. At the destination port, RGNT is negated during the first 8 positions of the TDM frame and then asserted for the next 56 positions. This allows the fibre channel frame to be received by the fibre channel interface.

The FCPA routes frames through the multi-protocol channel switch crosspoint. The switch crosspoint is capable of routing connection oriented traffic. The FCPA routing algorithm takes advantage of a unidirectional routing command that is present in the multi-protocol channel switch crosspoint switching boards to route connectionless traffic. This command allows a frame to be routed from a source port A to a destination port B while simultaneously allowing a frame to be routed from the source port B to a destination port C. This is in contrast to connection oriented service, which restricts traffic between two ports exclusively until the connection is broken, even during intervals when there is no traffic between the two ports. The unidirectional capability allows more bandwidth to be used within the multi-protocol channel switch crosspoint switching logic. Additionally, the FCPA takes advantage of a group connect capability of the crosspoint switching boards, wherein a single connection request combines the four channel timeslots from a board into a single quadruple rate channel through the crosspoint. The command to the crosspoint switch logic, and the response, are communicated in the message field of the TDM frame format (Table 4). The format for the command and its response from the multi-protocol channel switch crosspoint logic are shown in Table 5 below.

TABLE 5

Unidirectional Connection Command/Response Definition

| Bits | 35:31 | 30:29 | 28:27 | 26:18 | 17:9 | 8:0 |
|---|---|---|---|---|---|---|
| | | | Command to Crosspoint | | | |
| Definition | CMC | GRP | | Address A | Address B | |
| Values | 01011 | 11 | XX | 1 & PortA | 1 & PortB | x |
| | | | Solicited Response from Crosspoint | | | |
| Definition | CMD | GRP | Port A | Port B Connection Status | Connection Status | X |
| Values | 01011 | 11 | XX | | | |

This message requests a unidirectional connection between the port sending the data to the multi-protocol channel switch crosspoint logic (Port A) and the port receiving the data from the multi-protocol channel switch crosspoint logic (Port B). The message fields are defined as below. Any fields that contain 'Xs' are undefined bits and are not used.

GRP—This is the group connect field. For the FCPA, all of the time slots within the TDM frame are directed to one port. Therefore, this field is always set to a value of '11' for connections made by the FCPA.

Address A—For the command, this field contains the sending port's physical address within the multi-protocol channel switch. It is a 9-bit field whereby the lower 8 bits contain the physical address. The ninth bit is always a '1', indicating the intent to make the connection. The response (connection status) indicates whether a third port is already connected to the sending port. If it is, the response contains all '1s' in this field. If a connection is not present, the ninth bit contains a '0' in this field. The intent of this command is to make a unidirectional connection to the port represented by the Port B field. Therefore, the contents of this field during the response do not provide any value currently.

Address B—For the command, this field contains the receiving port's physical address within the multi-protocol channel switch. It is a 9-bit field whereby the lower 8 bits contain the physical address. The ninth bit is always a '1', indicating the intent to make the connection. The response (connection status) indicates whether the connection was made. A connection is established if this field contains all '0s', indicating no previous connection existed at the time of this command. If it contains all '1s', then a previous connection still exists, i.e. the present command did not make the required connection.

The fibre channel address needs to be translated by the switch interface into a multi-protocol channel switch physical crosspoint logic address. For ESCON application applications, this address normally contains 8 bits that allows addressing all 256 ports within the director. These 256 ports are contained on 64 ESCON port adaptors where each ESCON port adaptor contains 4 ports. For the FCPA, two ports are logically allocated to each card, mother and daughter, that comprise the FCPA. Once the frame enters the fibre channel interface switch, it routes the frame based on the destination address within the fibre channel header of the frame. Therefore, the address translation needs to route the frame to the correct slot. After this, the fibre channel interface switch executes the final route of the frame to the destination port.

The fibre channel interface generally provides a 6-bit address in the first half word of the frame to be transmitted through the multi-protocol channel switch crosspoint logic. The most significant 4 bits (5:2) identify the destination FCPA module. Bit 1 identifies whether the frame is destined for the mother board ('1') or daughter board ('0'). The least significant bit identifies one of two ports that are relevant to the particular card for the FCPA module. This address is passed with the rest of the frame to the destination port, where the fibre channel interface uses it to route the frame to its final destination.

A table implemented in the hardware allows the translation to take place. The processor has read and write access to this table while the hardware has read access only. This allows the processor to update the table while the FCPA is operational. It is loaded by the Adapter Processor during initialization, when an FCPA has been inserted or withdrawn from the director, or when an FCPA slot address has been swapped. It uses the 5 most significant address bits from the Fibre channel provided destination address to point to the physical address in the table. This physical address consists of two fields. The lower 6 bits identify the slot of the destination port. The upper two bits indicate whether the address is valid ('11') or not ('00'). Reasons for an invalid address are a) uninstalled FCPA slot, b) prohibited connection to that FCPA slot, c) blocked FCPA slot, d) code mismatch, or e) bad destination FCPA.

Through configuration of the validity bits, Fibre channel port adapters can be given a view of the switch that excludes all native ESCON ports from connections. The port prohibit maps of existing native ESCON ports are updated to exclude communications from the ESCON ports to any port slots occupied by FCPA. This allows native ESCON and Fibre Channel operations to be simultaneously supported in the native ESCON director.

Additionally, by selecting which address to map to each entry in each FCPA's translation table, a number of FCPAs can be defined visible to each other to create larger logical switches of up to 64 ports in 4 port (FCPA) increments.

The FCPAs that comprise a logical switch need not be in contiguous slots within the director, as the table includes a lookup to determine the appropriate slot number.

Multiple independent logical switches can be defined by invalidating the addresses of non-member FCPA from the translation tables of the FCPA that comprise each logical switch.

The switch interface determines that the address is valid and then inserts the lower 6 bits for the relevant address from this table into bits 16:11 of the Port B address field for the command. Bits 10 and 9 are normally used for determining which one of four ports on a ESCON port adaptor that the ESCON port is to be the destination port. For the FCPA, these are set to zero since only the slot needs to be identified. The fibre channel interface switch takes care of routing the frame to one of the four onboard ports based on the destination address within the first half word of the fibre channel extended frame.

The routing algorithm for frames between FCPA modules takes into account the availability of the destination FCPA to accept frames. Some examples for conditions where the destination FCPA cannot accept new frames are initialization, buffer full conditions, and link recovery. Allowing the destination FCPA to break the connection resolves these conditions. This method uses the unidirectional conditional connection command to route the frame. When the destination FCPA detects the end of the frame, it verifies that the fibre channel interface can accept a frame after the previous one is sent to the link. If it can, the destination FCPA issues a disconnect command where both addresses contain the destination port's address (disconnect from itself). This breaks the unidirectional path between the source and destination ports so that other ports can route frames to the destination port. The destination FCPA does need to know the physical address for the source port for this method.

If the destination port cannot accept a new frame, it maintains the original connection with the source port to prevent its buffer from being overrun. No other ports can route frames to the same destination port because they see that a connection already exists. Additionally, the source port cannot route frames to the same destination port even though the connection exists.

This is because the connection algorithm requires that a new connection be made for each frame to be routed (the destination port was previously disconnected). The source port can route frames to other ports while the connection to the original destination port still exists. This can happen because the destination port blocks traffic from the crosspoint until it can accept new frames and has issued the disconnect command from itself.

It will be apparent to those of ordinary skill in the art that methods disclosed herein may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of adapting a native ESCON director to provide fibre channel switching capability comprising:

providing a fibre channel port adapter comprising at least one board that can be installed into at least one slot in a multi-protocol channel switch having a central switch;

connecting the port adapter to a Fibre Channel device;

wherein said method permits interconnection through the multi-protocol channel switch, thereby allowing connection between and exchange of information between any two desired ports and multiple internal crosspoint channels are simultaneously combined to quadruple internal I/O channel bandwidth between Fibre Channel Port Adapters without modification to existing crosspoint hardware.

2. The method according to claim 1, wherein the native ESCON director is capable of supporting the installation and operation of Fibre Channel Port Adapters within unused ESCON port adapter board slots pairs wherever they may be available within the director.

3. The method according to claim 1, wherein the native ESCON director is capable of simultaneously supporting native ESCON port adapters and Fibre Channel Port adapters within the same director.

4. The method according to claim 1, wherein independent Fibre Channel Port Adapters located in the same native ESCON director can be combined to operate as a single logical Fibre Channel switch with increased port count.

5. The method according to claim 1, wherein the number of switched ports provided by a single logical Fibre Channel switch can be variably defined up to 64 ports.

6. The method according to claim 1, wherein multiple logical Fibre Channel switches can be defined to simultaneously operate independently of each other within a single native ESCON director.

7. The method according to claim 1, further comprising determining the availability of a destination fibre channel port adapter for frame routing.

8. The method according to claim 7 further comprising allowing the destination fibre channel port adapter to break a communication connection.

9. The method according to claim 8 wherein the step of allowing the destination fibre channel port adapter to break a communication connection is in response to initialization, buffer full conditions and link recovery.

10. The method according to claim 9 further comprising maintaining the communication connection with a source port to prevention buffer overrun at the destination fibre channel port adapter.

11. A fibre channel port adapter capable of adapting a native ESCON director to provide fibre channel switching capability, comprising:

means for providing a fibre channel port adapter, wherein the means for providing is comprised of four bi-directional fibre channel links, a fibre channel front end processor located on a first board that connects to media and provides buffered data for a multi-protocol channel switch crosspoint, said first board comprising an interface to a crosspoint, a second interface to said front end processor located on a second board, said second board containing a second interface to said crosspoint, an adapter processor and a node processor and connections for connecting said first and second boards; and means for connecting the port adapter to a Fibre Channel device, wherein the connection permits interconnection through an multi-protocol channel switch, thereby allowing connection between and exchange of information between any two desired ports;

wherein multiple internal crosspoint channels are simultaneously combined to quadruple internal I/O channel bandwidth between Fibre Channel Port Adapters without modification to existing crosspoint hardware.

12. A method according to claim 11, wherein the native ESCON director is capable of supporting the installation and operation of Fibre Channel Port Adapters within unused ESCON port adapter board slots pairs wherever they may be available within the director.

13. A method according to claim 11, wherein the native ESCON director is capable of simultaneously supporting native ESCON port adapters and Fibre Channel Port adapters within the same director.

14. A method according to claim 11, wherein independent Fibre Channel Port Adapters located in the same native ESCON director can be combined to operate as a single logical Fibre Channel switch with increased port count.

15. A method according to claim 11, wherein the number of switched ports provided by a single logical Fibre Channel switch can be variably defined up to 64 ports.

16. A method according to claim 11, wherein multiple logical Fibre Channel switches can be defined to simultaneously operate independently of each other within a single native ESCON director.

* * * * *